(12) United States Patent
Atherton

(10) Patent No.: US 10,270,765 B2
(45) Date of Patent: Apr. 23, 2019

(54) ENABLING APPLICATION FUNCTIONS RESPONSIVE TO BIOMETRIC INPUT FROM MORE THAN ONE PERSON

(71) Applicant: Lenovo Enterprise Solutions (Singapore) Pte. Ltd., Singapore (SG)

(72) Inventor: William E. Atherton, Hillsborough, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 401 days.

(21) Appl. No.: 14/876,193

(22) Filed: Oct. 6, 2015

(65) Prior Publication Data

US 2017/0099286 A1   Apr. 6, 2017

(51) Int. Cl.
| | |
|---|---|
| G06F 21/00 | (2013.01) |
| H04L 29/06 | (2006.01) |
| H04W 12/06 | (2009.01) |
| G06F 21/32 | (2013.01) |
| G06F 21/40 | (2013.01) |
| H04M 1/725 | (2006.01) |
| H04W 4/02 | (2018.01) |
| H04W 12/08 | (2009.01) |
| H04W 88/02 | (2009.01) |

(52) U.S. Cl.
CPC .......... *H04L 63/0861* (2013.01); *G06F 21/32* (2013.01); *G06F 21/40* (2013.01); *H04L 63/0492* (2013.01); *H04L 63/0853* (2013.01); *H04M 1/72577* (2013.01); *H04W 12/06* (2013.01); *G06F 2221/2111* (2013.01); *H04L 63/107* (2013.01); *H04M 1/72569* (2013.01); *H04W 4/023* (2013.01); *H04W 12/08* (2013.01); *H04W 88/02* (2013.01)

(58) Field of Classification Search
CPC ............. H04L 63/0861; H04L 63/0492; H04L 63/0853
USPC ........................................................ 713/186
See application file for complete search history.

(56) References Cited

U.S. PATENT DOCUMENTS

| | | | | |
|---|---|---|---|---|
| 2012/0233070 | A1* | 9/2012 | Calman ............. | G06Q 20/3276 705/41 |
| 2014/0329513 | A1* | 11/2014 | Jacob .................... | B60K 28/00 455/418 |
| 2015/0061895 | A1* | 3/2015 | Ricci ...................... | H04W 4/22 340/902 |
| 2015/0116086 | A1* | 4/2015 | Kim ........................ | G06F 21/32 340/5.83 |
| 2015/0348122 | A1* | 12/2015 | Cornell ............. | G06Q 30/0269 705/14.58 |

(Continued)

*Primary Examiner* — Anthony D Brown
(74) *Attorney, Agent, or Firm* — Jeffrey L. Streets

(57) ABSTRACT

A method includes running an application on a mobile computing device, the mobile computing device accepting biometric input, and the mobile computing device enabling one or more function of the application only in response to the biometric input indicating that more than one person is present in the same location. Examples of suitable biometric input include a fingerprint, heartbeat, iris scan, facial recognition, and voice recognition. The biometric input may be provided directly to the mobile computing device from the more than one person present, or the biometric input may be provided by a first person to a first mobile computing device and by a second person to a second mobile computing device.

24 Claims, 4 Drawing Sheets

(56) References Cited

U.S. PATENT DOCUMENTS

2015/0358316 A1\* 12/2015 Cronin ............... H04L 63/0861
726/6

\* cited by examiner

ENABLING APPLICATION FUNCTIONS RESPONSIVE TO BIOMETRIC INPUT FROM MORE THAN ONE PERSON

BACKGROUND

Field of the Invention

The present invention relates to a computing device restricting use of an application subject to receiving required biometric input.

Background of the Related Art

Computing devices may be used to run any number of helpful application programs that can provide a benefit to users in many situations. However, there are some situations where it is desirable to restrict use of the application or a feature of the application. The restriction may be implemented for the safety of the user or according to a requirement of a third party service provider. However, such restrictions may be onerous and prevent legitimate and safe use of the applications.

BRIEF SUMMARY

One embodiment of the present invention provides a method comprising running an application on a mobile computing device, the mobile computing device accepting biometric input, and the mobile computing device enabling one or more function of the application only in response to the biometric input indicating that more than one person is present in the same location.

Another embodiment of the present invention provides a computer program product comprising program instructions embodied on a non-transitory computer readable storage medium, wherein the program instructions are executable by a processor to cause the processor to perform a method. The method comprises running an application on a mobile computing device, the mobile computing device accepting biometric input, and the mobile computing device enabling one or more function of the application only in response to the biometric input indicating that more than one person is present in the same location.

DETAILED DESCRIPTION

Figure 1:
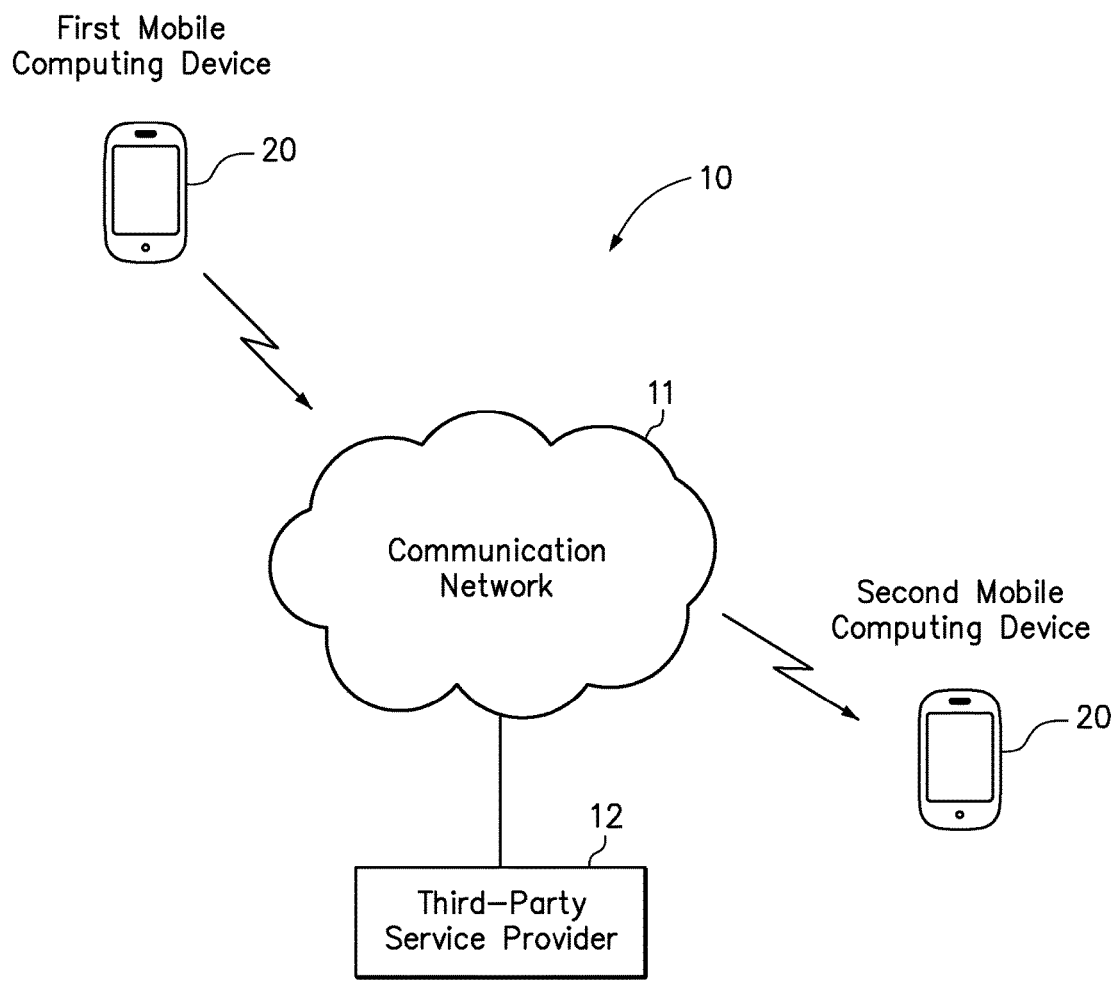
FIG. 1 is a diagram of a system in which embodiments of the present invention may be performed.

One embodiment of the present invention provides a method comprising accessing an application using a mobile computing device, the mobile computing device accepting biometric input, and the mobile computing device enabling one or more function of the application only in response to the biometric input indicating that more than one person is present in the same location.

A mobile computing device may access the application in various ways. In one example, the mobile computing device may access the application by running the application that is stored in memory that is part of the mobile computing device. This is a common way to access an application that is used frequently. In another example, the mobile computing device may access the application by using a web browser to render a website or webpage that is stored on a third party server.

The biometric input may, without limitation, be selected from a fingerprint, heartbeat, iris scan, facial recognition, and voice recognition. For any given application, the type of biometric input may be limited or any type of biometric input may be accepted.

In one implementation, the biometric input may be provided directly to the mobile computing device from the more than one person present in the same location. For example, the single mobile computing device would be used to enter the biometric input from each person. Entering all of the biometric input directly into a single device is beneficial in that it indicates that each person was actually present in the same location. Alternatively, the method may involve the use of multiple mobile computing devices. In such an implementation, the biometric input of a first person may be entered into a first mobile computing device and the biometric input of a second person may be entered into a second mobile computing device. Then, the second mobile computing device may send the biometric input obtained from the second person directly to the first mobile computing device. Preferably, the biometric input to the second mobile computing device is encrypted before sending to the first mobile computing device to prevent any third party from obtaining the biometric input. However, since multiple devices are used, it is necessary to verify that each person is present in the same location by determining that each device is in the same location. For example, multiple devices may be determined to be in the same location if the biometric input is sent from the second mobile computing device to the first mobile computing device using peer-to-peer wireless communication, such as a near field communication that only transmits a few feet. Still further, the second mobile computing device may send its location, such as in the form of coordinates obtained using a global positioning system, so that the first mobile computing device may verify that the first and second mobile computing devices are in the same location. The "same location" may be defined by boundaries of an identifiable destination, such as a store or park, or by a maximum distance separating the devices.

In an alternative implementation, biometric input may be separately input to a plurality of mobile computing devices, such as first and second mobile computing devices, and each mobile computing device may subsequently send the biometric input to a third party service. Furthermore, each mobile computing device may obtain location data identifying the location of the respective mobile computing device and send the location data to the third party service. The biometric input and/or the location data may be sent to the third party service either using an application running on each of the mobile computing devices or using a web browser that is accessing a website of the third party service. Once the third party service receives the biometric input and location data, the third party service may make determinations regarding the number of people (i.e., whether the biometric input is from more than one person) and their respective locations (i.e., whether more than one person is present in the same location). The third party service, such as a website, may enable or provide use of one or more function of the website only in response to the biometric input indicating that more than one person is present in the same location.

In a further embodiment, the method may further comprise periodically requesting reentry of the biometric input, and providing continued use of one or more function of the application, after requesting reentry of the biometric input, only in response to reentry of the requested biometric input. Optionally, the periodic requests for reentry of the biometric input may be made according to uniform or random time periods, or upon the occurrence of an event. For example, a request for reentry may be made uniformly every 30 minutes, after expiration of a time period randomly selected from within a range of time periods, or in response to detecting that one of the mobile computing devices used to input the biometric data is no longer within a given distance of another of the mobile computing devices used to input the biometric data. The reentry may serve to verify that the same people or same number of people are still present in the same location.

In order to provide enhanced privacy, the method may delete the biometric input from memory of the mobile computing device after providing use of the one or more function of the application. This is possible because the biometric input is merely being used to identify a number of distinct persons. Once that purpose has been satisfied, the biometric input is no longer needed.

In one specific implementation, the application is a messaging application, such as email or text messaging. Accordingly, the method may further include detecting that the mobile computing device is in a moving automobile, and entering a safe mode that automatically disables texting while the mobile computing device is in the moving automobile. Still further, the method may enable texting (i.e., override the automatic disable of texting in a moving automobile) only in response to the biometric input indicating that more than one person is present in the same location (i.e., inside the moving automobile). Optionally, the method may require biometric input from at least one person while the automobile is not moving. The method may detect that the mobile computing device is in a moving automobile using input from a global positioning system to determine whether the mobile computing device is traveling at speed greater than a predetermined speed threshold.

In another specific implementation, the application is a toll road access program, and the one or more function includes reporting the number of people present in an automobile. Optionally, the method may write the number of people present in the automobile to a read-write RFID device, and an RFID reader may then read the number of people present in the automobile from the read-write RFID device as the read-write RFID device is moving along the toll road. Still further, the method may determine a toll to charge an account associated with the automobile, wherein the toll is a function of the number of people present in the automobile. Where more than one mobile computing device is determined to be present in the moving automobile, each mobile computing device may identify itself to the RFID reader operated by the toll road authority. In the later situation, the toll may be divided among accounts associated with each mobile computing device that is present in the moving automobile. Any discounts may also be divided among the accounts associated with each mobile computing device.

In yet another specific implementation, the application is a coupon wallet containing a coupon or a retailer website providing a coupon, where the coupon is conditioned upon a given number of more than one person being present in a store where the coupon may be redeemed. As used herein, the term "coupon" is used in a broad sense to include a document, article or entity, in physical or digital form, that may be redeemed for a fixed or variable financial discount or rebate when purchasing a product or service. In one option, the amount or nature of the coupon may vary in response to the number of persons present.

In a still further specific implementation, the application is a video player, and the one or more function of the application is playing the video. For example, a web-based video service may be free of charge when more than a predetermined number of persons are present to view the video.

Another embodiment of the present invention provides a computer program product comprising program instructions embodied on a non-transitory computer readable storage medium, wherein the program instructions are executable by a processor to cause the processor to perform a method. The method comprises accessing an application using a mobile computing device, the mobile computing device accepting biometric input, and the mobile computing device enabling one or more function of the application only in response to the biometric input indicating that more than one person is present in the same location.

The foregoing computer program products may further include computer readable program code for implementing or initiating any one or more aspects of the methods described herein. Accordingly, a separate description of the methods will not be duplicated in the context of a computer program product.

FIG. 1 is a diagram of a system 10 including a first mobile computing device 20 and a second mobile computing device 20 in communication over a communication network 11. The sending and receiving communication devices 20 may or may not be identical. In accordance with certain embodiments, a third-party service provider 12 may also be in communication with the computing devices 20 over the network 11. For example, the third-party service provider 12 may be, without limitation, a video hosting and delivery service, a toll road monitoring authority, or store or online discount service.

Figure 2:
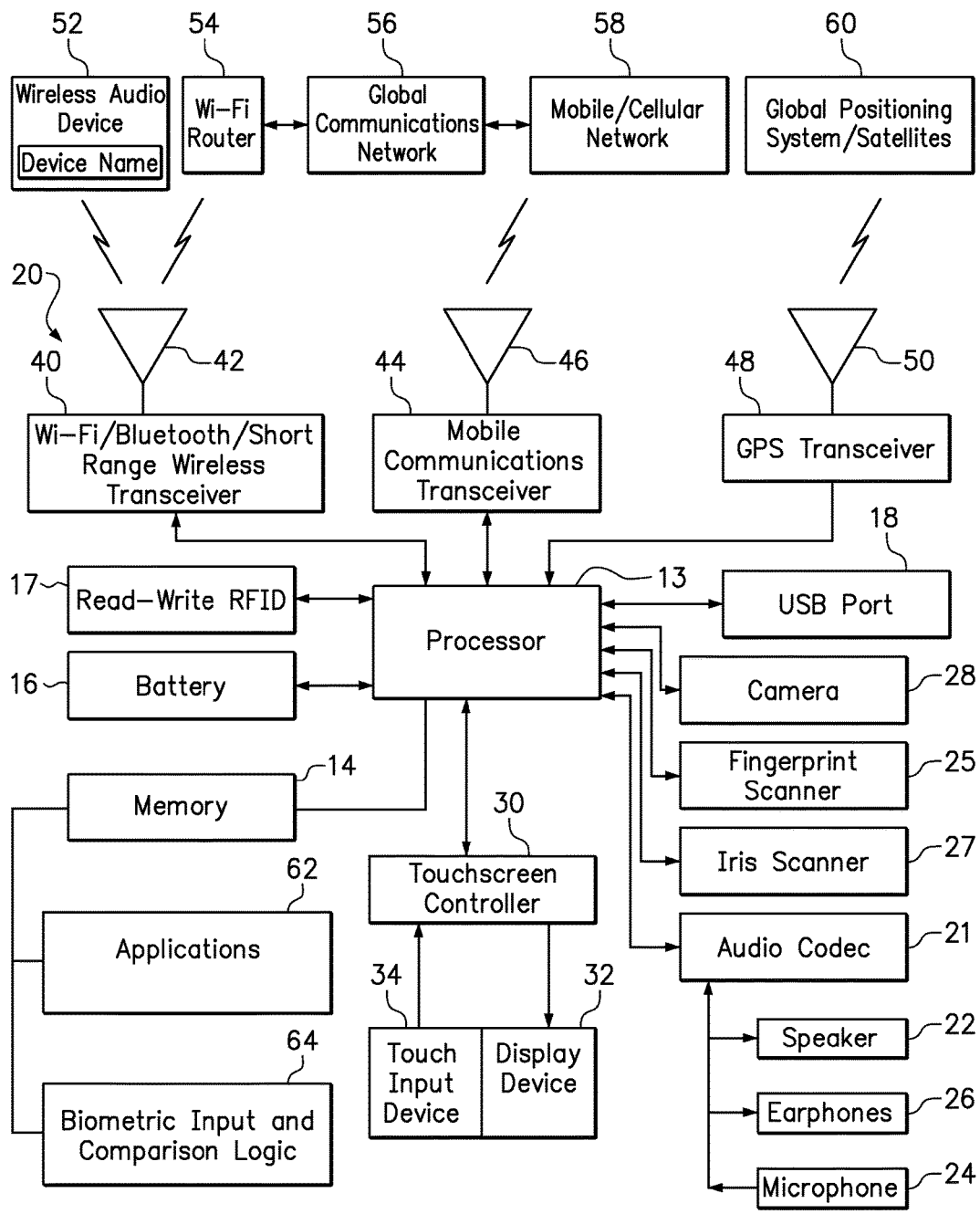
FIG. 2 is a diagram of a mobile computing device suitable for use in one or more embodiments of the present invention.

FIG. 2 is a diagram of the mobile computing device 20, such as a smart phone or tablet computer, capable of implementing embodiments of the present invention. The mobile computing device 20 may be representative of a single mobile computing device suitable for use in embodiments that only require one mobile computing device, or either or both of the first mobile computing device and the second mobile computing device suitable for use in embodiments that involve more than one mobile computing device.

The computing device 20 may include a processor 13, memory 14, a battery 16, a universal serial bus (USB) port 18, a camera 28, and an audio codec 21 coupled to a speaker 22, a microphone 24, and an earphone jack 26. The communication device 10 may further include a touchscreen controller 30 which provides a graphical output to the display device 32 and an input from a touch input device 34. Collectively, the display device 32 and touch input device 34 may be referred to as a touchscreen.

The computing device 20 may also include a Wi-Fi and/or Bluetooth transceiver 40 and corresponding antenna 42 allowing the device to communicate with a wireless (Bluetooth) audio device 52 or a Wi-Fi router 54, a mobile communication transceiver 44 and corresponding antenna 46 allowing the device to communicate over a mobile/cellular network 58, and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet.

In order to implement one or more embodiment of the present invention, the memory 14 may store one or more applications 62 and biometric input and comparison logic 64. Biometric input may be obtained or entered using the microphone 24 or the camera 28. In addition, the computing device 20 may be further equipped with a fingerprint scanner 25 and/or an iris scanner 27 for receiving biometric input. An optional read-write RFID device 17 is also shown for writing data to the readable RFID device according to at least one embodiment of the present invention.

Figure 3:
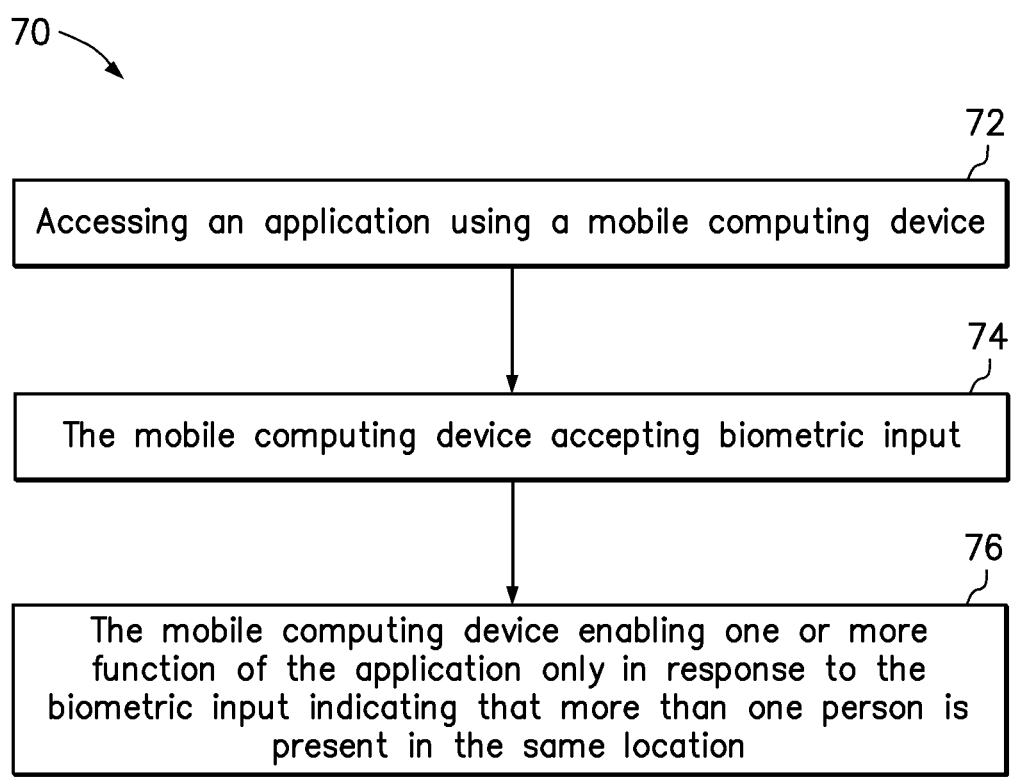
FIG. 3 is a flowchart of a method according to one embodiment of the present invention.

FIG. 3 is a flowchart of a method 70 according to one embodiment of the present invention. In step 72, the method includes accessing an application using a mobile computing device. Step 74 includes the mobile computing device accepting biometric input. Step 76 includes the mobile computing device enabling one or more function of the application only in response to the biometric input indicating that more than one person is present.

Figure 4:
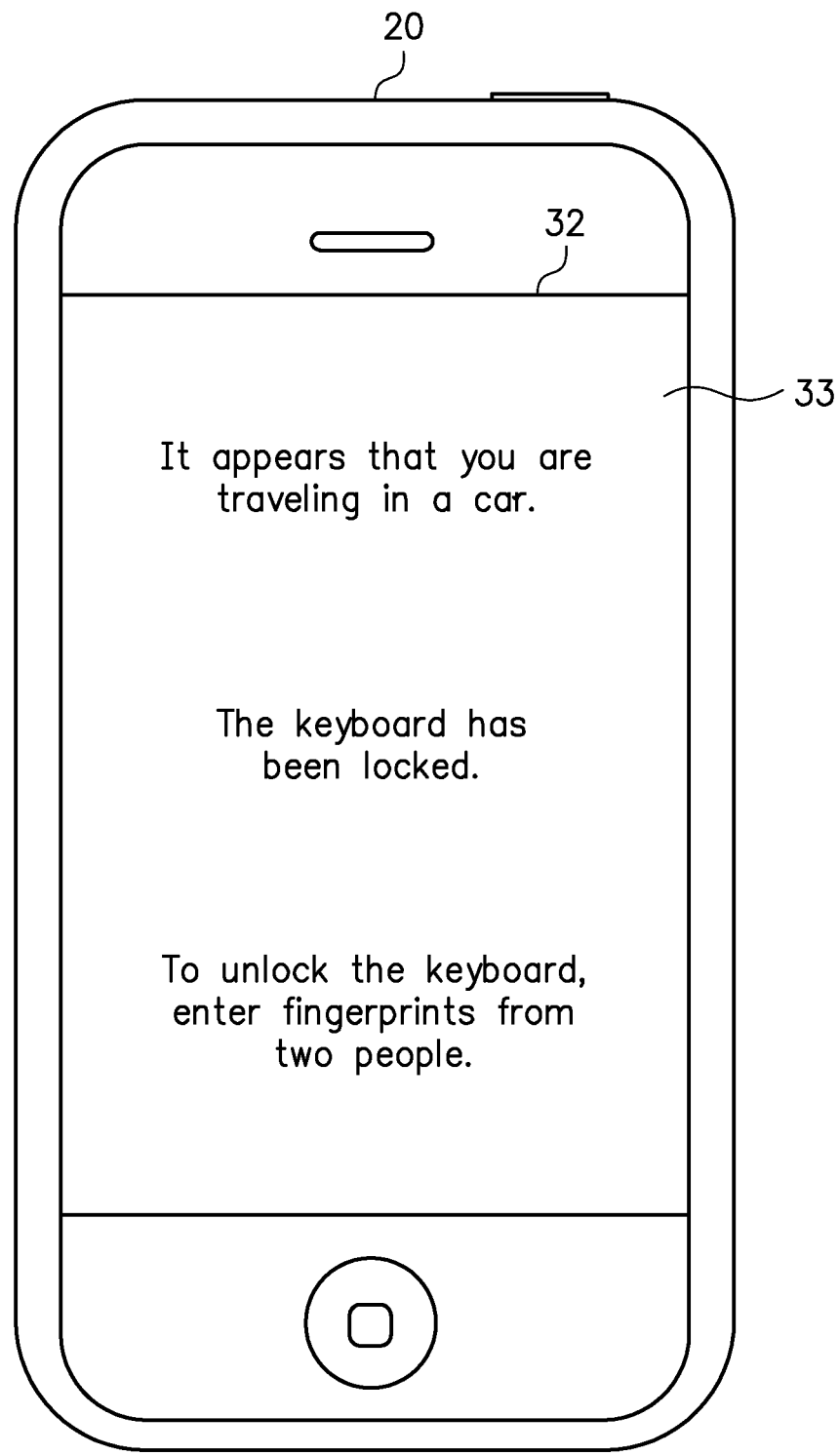
FIG. 4 is a diagram of a display screen of a mobile computing device illustrating an on-screen notification.

FIG. 4 is a diagram of a display screen 32 of a computing device 20 illustrating an on-screen notification 33, as might appear on the computing device in various embodiments described herein. The non-limiting example in FIG. 4 is directed to a specific implementation of a computing device 20 having a messaging application that automatically disables texting while driving. Specifically, the messaging application has locked the keyboard and provides notification to a user. The notification, and perhaps a similar audio statement, says "It appears that you are traveling in a car." "The keyboard has locked." "To unlock the keyboard, enter fingerprints from two people."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages or web languages/interfaces/technologies, such as HTML. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the non-transitory computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   a first mobile computing device accessing an application;
   the first mobile computing device accepting first biometric input directly from a first person present with the first mobile computing device;
   the first mobile computing device receiving second biometric input of a second person from a second mobile computing device and
   the first mobile computing device enabling one or more function of the application only in response to the biometric input indicating that more than one person is present in the same location.

2. The method of claim 1, wherein the biometric input is selected from a fingerprint, heartbeat, iris scan, facial recognition, and voice.

3. The method of claim 1, wherein the first mobile computing device receives the biometric input directly from the second mobile computing device using peer-to-peer wireless communication.

4. The method of claim 1, further comprising:
   the first mobile computing device receiving a current location of the second mobile computing device;
   obtaining a current location of the first mobile computing device; and
   verifying that the first mobile computing device and the second mobile computing device are in a common location.

5. The method of claim 1, further comprising:
   the first mobile computing device sending the first biometric input and a current location of the first mobile computing device to a third party service; and
   the second mobile computing device sending the second biometric input and a current location of the second mobile computing device to the third party service, wherein the third party service causes the application to provide use of one or more function of the application only in response to using the first and second biometric input and the current locations of the first and second mobile computing devices to determine that more than one person is present in the same location.

6. The method of claim 1,
   wherein the second biometric input receiving by the first mobile computing device from the second mobile computing device is encrypted by the second mobile computing device.

7. The method of claim 1, further comprising:
   periodically requesting reentry of the first and second biometric input; and
   providing continued use of one or more function of the application after requesting reentry of the biometric input only in response to receiving the first and second biometric input within a predetermined period of time.

8. The method of claim 1, further comprising:
   deleting the first biometric input from memory of the first mobile computing device after providing use of the one or more function of the application.

9. The method of claim 1, wherein the application is a messaging application that automatically disables messaging in response to detecting that the mobile computing device is in a moving automobile.

10. The method of claim 9, further comprising:
    requiring biometric input from at least one person while the automobile is not moving.

11. The method of claim 9, wherein detecting that the mobile computing device is in a moving automobile includes using input from a global positioning system to determine whether the mobile computing device is traveling at speed greater than a predetermined speed threshold.

12. A computer program product comprising program instructions embodied on a non-transitory computer readable storage medium, the program instructions executable by a processor of a first mobile computing device to:
    access an application;
    accept first biometric input directly from a first person present with the first mobile computing device;
    receive second biometric input of a second person from a second mobile computing device; and
    enable one or more function of the application only in response to the biometric input indicating that more than one person is present in the same location.

13. The computer program product of claim 12, wherein the first mobile computing device receives the biometric input directly from the second the mobile computing device using peer-to-peer wireless communication.

14. The computer program product of claim 12, further comprising:
the first mobile computing device receiving a current location of the second mobile computing device;
obtaining a current location of the first mobile computing device; and
verifying that the first mobile computing device and the second mobile computing device are in a common location.

15. The computer program product of claim 12, further comprising:
the first mobile computing device sending the first biometric input and a current location of the first mobile computing device to a third party service; and
the second mobile computing device sending the second biometric input and a current location of the second mobile computing device to the third party service, wherein the third party service causes the application to provide use of one or more function of the application only in response to using the first and second biometric input and the current locations of the first and second mobile computing devices to determine that more than one person is present in the same location.

16. The computer program product of claim 12, further comprising:
periodically requesting reentry of the first and second biometric input; and
providing continued use of one or more function of the application after requesting reentry of the biometric input only in response to receiving the first and second of the same biometric input within a predetermined period of time.

17. The computer program product of claim 12, wherein the biometric input is selected from a fingerprint, heartbeat, iris scan, facial recognition, and voice.

18. The computer program product of claim 12, wherein the second biometric input receiving by the first mobile computing device from the second mobile computing device has been encrypted by the second mobile computing device.

19. The computer program product of claim 12, further comprising:
deleting the first biometric input from memory of the first mobile computing device after providing use of the one or more function of the application.

20. The computer program product of claim 12, wherein the application is a messaging application that automatically disables messaging in response to detecting that the mobile computing device is in a moving automobile.

21. The computer program product of claim 20, wherein the program instructions are further executable by the processor of the first mobile computing device to:
require biometric input from at least one person while the automobile is not moving.

22. The computer program product of claim 20, wherein the program instruction executable by the processor to detect that the mobile computing device is in a moving automobile includes program instruction executable by the processor to use input from a global positioning system to determine whether the mobile computing device is traveling at speed greater than a predetermined speed threshold.

23. An apparatus, comprising:
at least one storage device for storing program instructions; and
at least one processor of a first mobile computing device for executing the program instructions to:
accept first biometric input from a first user into the first mobile computing device;
identify a location of the first mobile computing device;
receive a message from a second mobile computing device, wherein the message includes second biometric input from a user of the second mobile computing device;
determine whether the first and second biometric input are from different users;
determine whether the first and second mobile computing devices are in the same location; and
enable one or more function of an application in response to determining that the first and second biometric input are from different users and that the first and second mobile computing devices are in the same location.

24. The apparatus of claim 23, the at least one processor of the first mobile computing device for further executing the program instructions to:
periodically request reentry of the first and second biometric input; and
provide continued use of one or more function of the application after requesting reentry of the biometric input only in response to receiving the first and second biometric input within a predetermined period of time.

* * * * *